(12) United States Patent
Nakabayashi et al.

(10) Patent No.: US 7,301,928 B2
(45) Date of Patent: Nov. 27, 2007

(54) WIRELESS PACKET TRANSFER APPARATUS AND METHOD

(75) Inventors: Sumie Nakabayashi, Kokubunji (JP); Masaru Adachi, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 185 days.

(21) Appl. No.: 11/145,988

(22) Filed: Jun. 7, 2005

(65) Prior Publication Data

US 2005/0276259 A1  Dec. 15, 2005

(30) Foreign Application Priority Data

Jun. 9, 2004  (JP)  ............................. 2004-171153

(51) Int. Cl.
   *H04Q 7/24*  (2006.01)
(52) U.S. Cl. .................. 370/338; 370/349; 370/465
(58) Field of Classification Search ................ 370/349, 370/338, 465
   See application file for complete search history.

(56) References Cited

U.S. PATENT DOCUMENTS

2005/0159185 A1*  7/2005  Hiramatsu .................. 455/560

FOREIGN PATENT DOCUMENTS

| JP | 7-245600 | 9/1995 |
|---|---|---|
| JP | 8-265304 | 10/1996 |
| JP | 09-219649 | 8/1997 |
| JP | 2000078197 | 3/2000 |
| JP | 2001-016584 | 1/2001 |
| JP | 2001268019 | 9/2001 |
| JP | 2002325074 | 11/2002 |
| JP | 2003-319007 | * 7/2003 |
| JP | 2003-338809 | 11/2003 |
| JP | 2003319007 | 11/2003 |
| JP | 2004007171 | 1/2004 |

OTHER PUBLICATIONS

"Error Correction Code and its application, Etoh and Kaneko, Ohm publishing Co., pp. 161-165, Dec. 25, 1996".

* cited by examiner

*Primary Examiner*—Nay Maung
*Assistant Examiner*—Tuan H. Nguyen
(74) *Attorney, Agent, or Firm*—Mattingly, Stanger, Malur & Brundidge, P.C.

(57) ABSTRACT

An error correction encoding rate selection table is provided in an error correction processing unit of a packet transfer apparatus, and the table stores an error correction encoding rate preset to maintain a desired QoS in correspondence with a protocol type and an application type. When a transmission packet is transferred to a wireless transmission path, an encoding control unit judges the protocol type and application type of a transmission packet from a header of the transmission packet, in accordance with a judgment result and the error correction encoding rate selection table, an error correction encoding rate is selected, and the transmission packet is subjected to error correction encoding and transferred.

6 Claims, 14 Drawing Sheets

ERROR CONTROL UNIT

| ENCODING RATE | PUNCTURE PATTERN |
|---|---|
| 1/2 | C0: 1<br>C1: 1 |
| 3/4 | C0: 101<br>C1: 110 |
| 7/8 | C0: 1000101<br>C1: 1111010 |

ENCODING AND PUNCTURE PATTERN

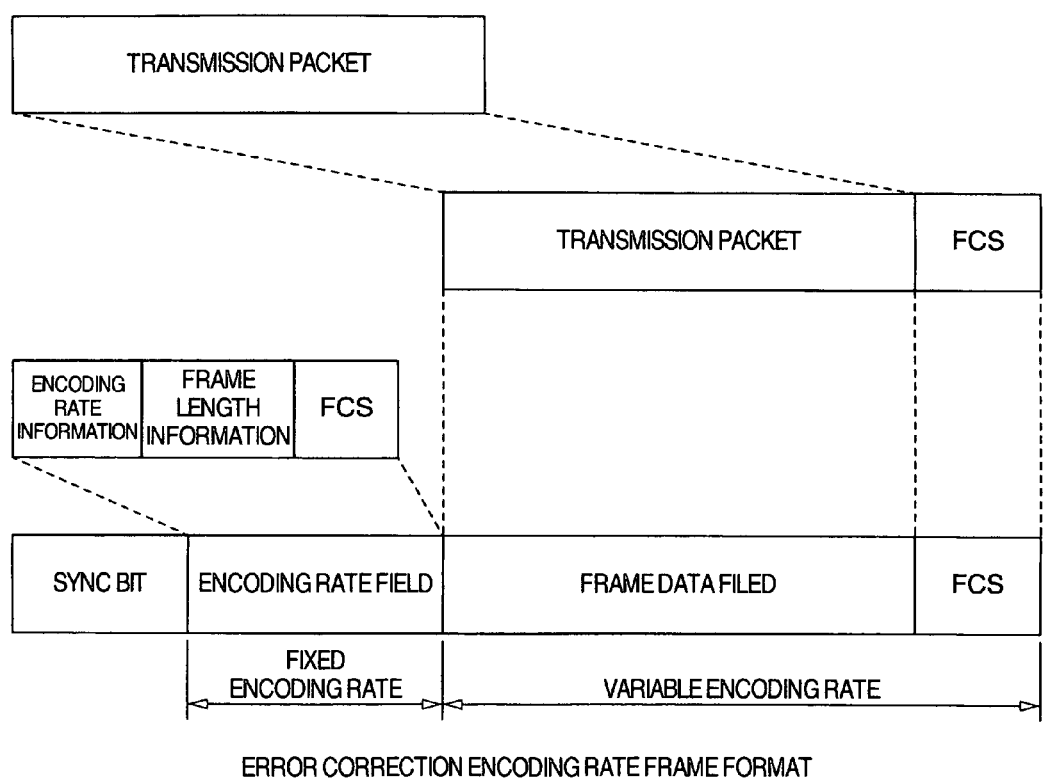

TCP HEADER FORMAT

UDP HEADER FORMAT

IP HEADER FORMAT

FIG.8

| PROTOCOL NUMBER | PORT NUMBER | ENCODING RATE |
|---|---|---|
| 6 (TCP) | | 1/2 |
| 17 (UDP) | | 3/4 |
| 17 (UDP) | 2050 | 7/8 |
| ⋮ | | |
| DEFAULT | | 1/2 |

FIRST EXAMPLE OF
ERROR CORRECTION ENCODING RATE SELECTION TABLE

FIG.9

| PROTOCOL NUMBER | PORT NUMBER | ERROR FRAME PROCESSING |
|---|---|---|
| 6 (TCP) | | DISCARD |
| 17 (UDP) | | DISCARD |
| 17 (UDP) | 2050 | TRANSFER |
| ⋮ | | |
| DEFAULT | | DISCARD |

FIRST EXAMPLE OF DECODING CONTROL TABLE

FIG.16

| PROTOCOL NUMBER | PORT NUMBER | DESIRED QoS | ERROR FRAME PROCESSING |
|---|---|---|---|
| 6 (TCP) | | | DISCARD |
| 17 (UDP) | | $10^{-5}$ | DISCARD |
| 17 (UDP) | 2050 | $10^{-4}$ | TRANSFER |
| ⋮ | | | |
| DEFAULT | | | DISCARD |

SECOND EXAMPLE OF DECODING CONTROL TABLE

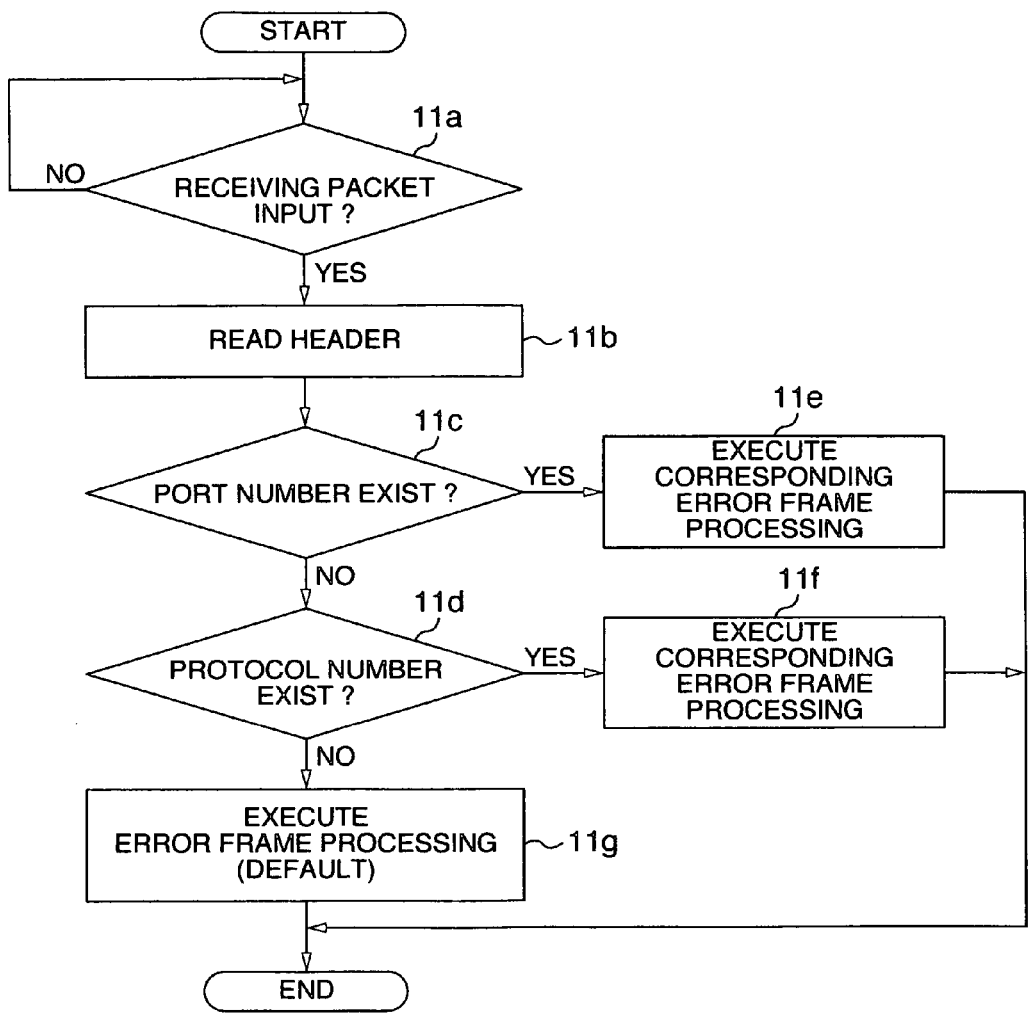

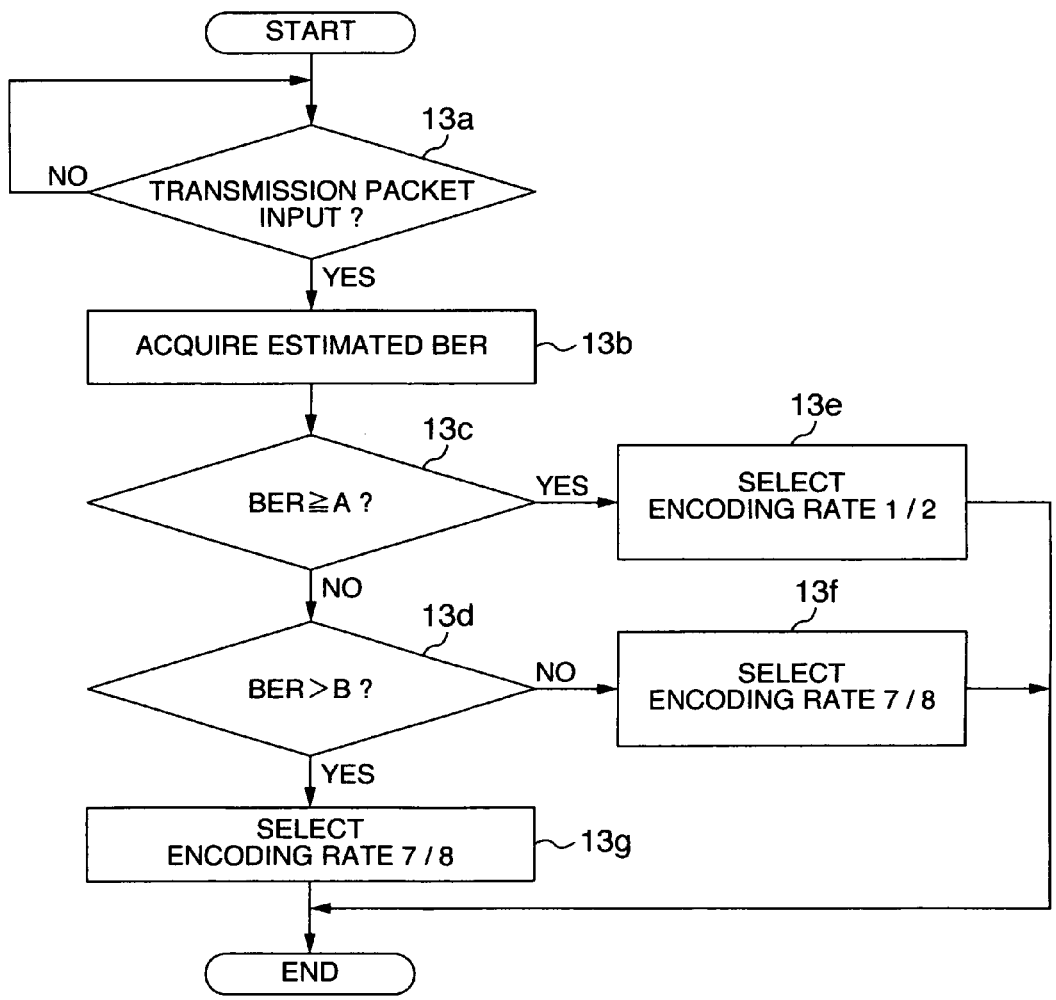

FIG. 14

| PROTOCOL NUMBER | PORT NUMBER | ENCODING RATE (DEFAULT) | ENCODING RATE (BER = A OR HIGHER) | ENCODING RATE (BER = A~B) | ENCODING RATE (BER = B OR LOWER) |
|---|---|---|---|---|---|
| 6 (TCP) |  | 1/2 | 1/2 | 1/2 | 7/8 |
| 17 (UDP) |  | 2/3 | 1/2 | 3/4 | 7/8 |
| 17 (UDP) | 2050 | 7/8 | 1/2 | 7/8 | 7/8 |
| -------- |  |  |  |  |  |
| DEFAULT |  | 1/2 | 1/2 | 1/2 | 7/8 |

THIRD EXAMPLE OF ERROR CORRECTION ENCODING RATE SELECTION TABLE

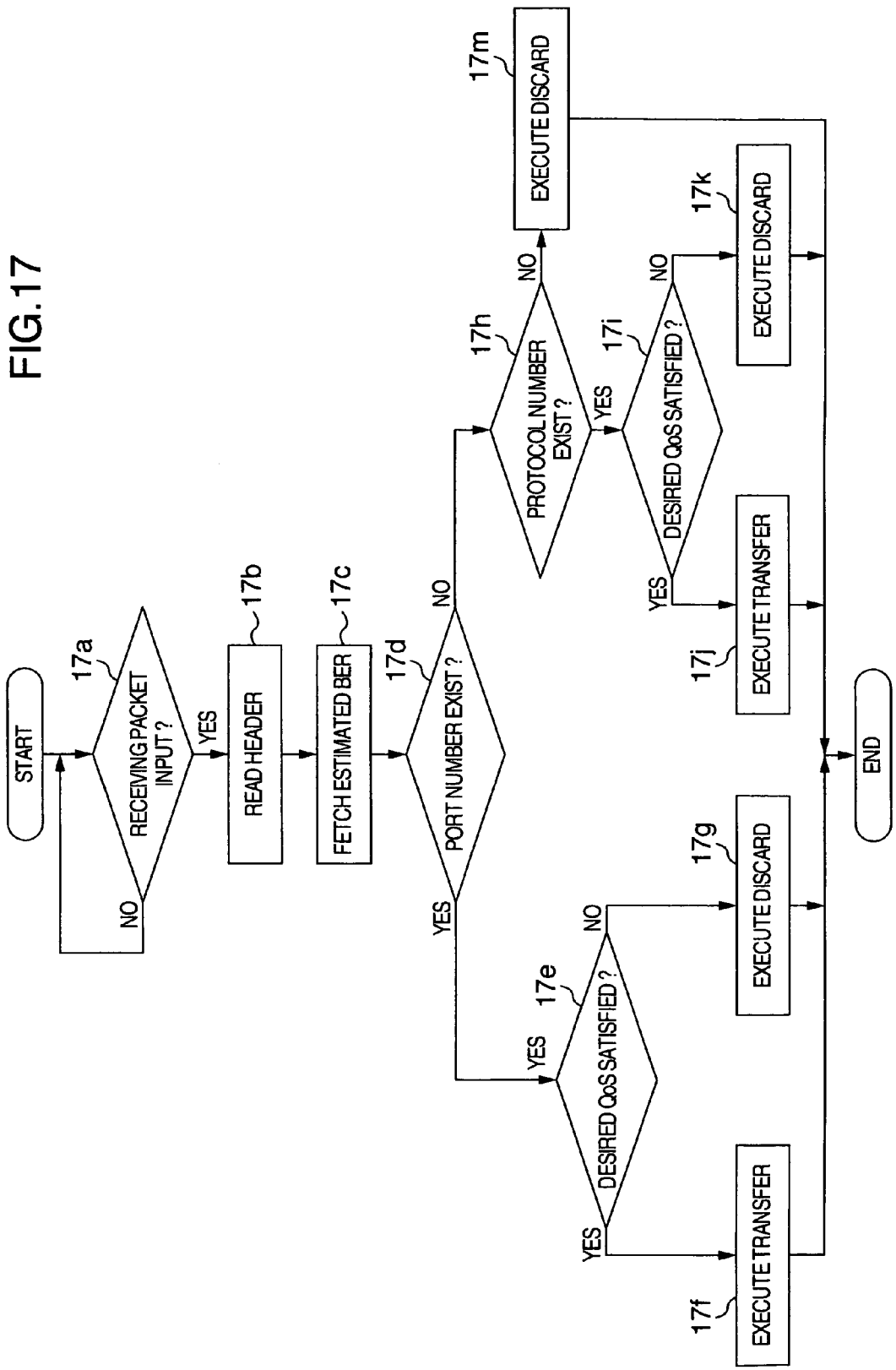

FIG.18

| PROTOCOL NUMBER | PORT NUMBER | APPLICATION SPECIFIC INFORMATION | ENCODING RATE (DEFAULT) | ENCODING RATE (BER > A) | ENCODING RATE (BER = A~B) | ENCODING RATE (BER < B) |
|---|---|---|---|---|---|---|
| 6 (TCP) | | | 1/2 | 1/2 | 1/2 | 7/8 |
| 17 (UDP) | | | 2/3 | 1/2 | 3/4 | 7/8 |
| 17 (UDP) | 20500 | SSRC=10 | 7/8 | 1/2 | 7/8 | 7/8 |
| | | SSRC=20 | 7/8 | 3/4 | 7/8 | 7/8 |
| DEFAULT | | | 1/2 | 1/2 | 1/2 | 7/8 |

FOURTH EXAMPLE OF ERROR CORRECTION ENCODING RATE SELECTION TABLE

WIRELESS PACKET TRANSFER APPARATUS AND METHOD

INCORPORATION BY REFERENCE

The present application claims priority from Japanese application JP2004-171153 filed on Jun. 9, 2004, the content of which is hereby incorporated by reference into this application.

BACKGROUND OF THE INVENTION

1. Field of the Invention

The present invention relates to a circuit switched wireless communication system such as an anti-disaster wireless communication system, and more particularly to a wireless packet transfer apparatus for transferring a packet by wireless by using Internet Protocol (IP).

2. Description of the Related Art

With the recent advancement of IP networks, various applications are provided by using IP. It is expected that seamless communications of IP are realized even among different types of networks such as wired and wireless networks, by adopting new technologies such as mobile IPv6 (IP version 6).

A public utility wireless communication system such as an anti-disaster wireless communication system generally adopts a circuit switching system. Using IP for wireless communication systems of this type is associated with the following problems. The first problem is that it takes a long time for data transmission because a transmission bandwidth is narrow (about 25.6 Kbit/s at a maximum transmission speed). The second problem is a throughput lowered by re-transmission caused by packet loss and a reduction in a window size of Transmission Control Protocol (TCP) and the like, because of a high bit error rate ($10^{-3}$ to $10^{-4}$) of a transmission line. The third problem is a fixed error correction encoding rate of each call because of circuit switching. Since a predetermined error correction encoding is performed for data transmission even in a good quality state of a wireless propagation path, the transmission bandwidth cannot be used efficiently. If moving image transmission is performed by using, for example, Moving Picture Experts Group 4 (MPEG4), this transmission is processed like file transfer which does not permit any error, although MPEG4 itself has an error proof function of about $10^{-3}$ to $10^{-4}$. The communication service quality such as a moving image display rate is therefore degraded. The fourth problem is that if a router or the like is used as an interface between wireless apparatus and a network, an error packet is unconditionally discarded because of a data link protocol of the router. Therefore, even if an application having a bit error permission function, such as MPEG4, is used, the whole packet is lost because of a bit error so that the image quality is degraded.

As technologies capable of solving the first problem, header compression technologies are known. The header compression technologies are described in the documents Request for Comment (RFC) compiling standardized specifications of Internet Engineering Task Force (IETF). TCP/IP header compression technologies are written in RFC1144, and IP/UDP/RTP header compression technologies are written in RFC2508. Although these header compression technologies are effective for Voice over IP (VoIP) packets having a short packet length, they provide less compression effects for long packets used in most of communications. As the technologies for solving the second problem, wireless TCP has been proposed. In a gateway apparatus disposed between a wired section and a wireless section, the wireless TCP performs division of a TCP connection and proxy re-transmission of TCP by mounting an agent. However, the wireless TCP cannot provide a TCP connection of end-to-end and the mount of an agent is complicated.

In mobile communications, the technologies have been proposed in which wireless parameters for error correction, modulation and the like are adaptively set in accordance with Quality of Service (QoS) (e.g., refer to JP-A-2003-259447).

The technologies described in JP-A-2003-259447 are directed to wide band mobile communications over 2 Mbps or faster ultra high speed mobile packet transmission systems, and do not consider a circuit switched wireless packet transmission system having a relatively low transmission speed to which the present invention is applied.

SUMMARY OF THE INVENTION

The present invention has bee made in the above-described circumstance, and an object of the present invention is to provide a wireless packet transfer apparatus and method capable of solving the above-described third and fourth problems in which although a circuit switched system is used, a packet can be transmitted by wireless at a high throughput while a desired Quality of Service (QoS) is maintained for each packet.

In order to achieve the above object, a first invention provides a wireless packet transfer apparatus to be used in a circuit switched wireless communication system for transmitting a packet among a plurality of networks via a wireless transmission path has a table for storing a plurality of transmission conditions expected when a packet is transmitted and a corresponding error correction encoding rate preset to each of the conditions to obtain a desired communication service quality. Transmission conditions of each transmission packet are judged. An error correction encoding rate is selected in accordance with the judged transmission conditions and the storage information in the table, and the transmission packet is subjected to error correction encoding at the selected error correction encoding rate and transferred to the wireless transmission line.

In one example, the table uses, as expected transmission conditions, at least one of a packet protocol type, a packet application type and a transmission quality of the wireless transmission path, and stores the expected transmission conditions and a corresponding error correction encoding rate preset to each of the expected transmission conditions to obtain a desired communication service quality under the expected transmission conditions.

According to the first invention, therefore, when a packet sent form a network is transferred to a wireless transmission path, the transmission conditions are judged in the packet unit. An error correction encoding rate corresponding to the judged transmission condition is selected from the table. The packet is subjected to error correction encoding at the selected error correction encoding rate and transferred to the wireless transmission path. Namely, each packet is transmitted by wireless after being subjected to error correction encoding at an error correction encoding rate necessary for maintaining a desired communication service quality and corresponding to the transmission condition of each packet, e.g., the packet protocol type, the packet application type or the transmission quality of the wireless transmission line. Accordingly, a wireless packet transmission of a high throughput can be realized even in a circuit switched system, while a desired communication service quality of each packet is maintained and the limited narrow transmission band is effectively utilized.

A second invention provides a wireless packet transfer apparatus to be used in a circuit switched wireless communication system for transmitting a packet among a plurality of networks via a wireless transmission path has a table for storing a plurality of transmission conditions expected when a packet is transmitted and a corresponding error processing method preset to each of the transmission conditions to obtain a desired communication service quality, the method processing a reception packet having an error. Transmission conditions of each packet received via the wireless transmission path are judged. An error processing method is selected in accordance with the judged transmission condition and the storage information in the table, and the reception packet is subjected to error processing by the selected error processing method and transferred to the wireless transmission path.

In one example, the table uses, as expected transmission conditions, at least one of a packet protocol type and a packet application type, and stores the expected transmission condition and corresponding information for designating whether a reception packet having an error is transferred or discarded.

In another example, the table uses, as expected transmission conditions, a packet protocol type, a packet application type and a desired communication quality set to each of the types, and stores the expected transmission conditions and corresponding information for designating whether a reception packet having an error is transferred or discarded.

According to the second invention, therefore, when a packet sent form a network is transferred to a wireless transmission path, the transmission condition is judged in the packet unit. Error processing for an error packet is performed in correspondence with the judged transmission condition. Therefore, for example, if a reception packet has an error and if a protocol or application itself of the reception packet has an error correction ability or an error permission ability, the reception packet is transferred directly to the network. If the protocol or application itself of the reception packet does not have an error correction ability or an error permission ability, the reception packet is discarded. In this manner, the error processing becomes possible by considering the function of the protocol or application of a packet. Therefore, also in the second invention, a wireless packet transmission of a high throughput can be realized even in a circuit switched system, while a desired communication service quality of each packet is maintained.

In summary, according to the inventions, the table stores in advance the packet transmission conditions and a corresponding error correction encoding rate or error processing method preset to each of the expected transmission conditions to obtain a desired communication service quality under the expected transmission conditions. The error correction encoding or error processing is executed for each transmission/reception packet in accordance with the transmission conditions and the storage information in the table.

Therefore, according to the present invention, a wireless packet transfer apparatus can be provided which can transfer a wireless packet efficiently even in a circuit switched system, while a desired communication service quality of each packet is maintained.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing the format of an error correction encoding frame generated by the error correction processing unit shown in FIG. 3.

FIG. 8 is a diagram showing the structure of an error correction rate selection table provided in the error correction processing unit shown in FIG. 3.

FIG. 9 is a diagram showing the structure of a decoding control table provided in the error correction processing unit shown in FIG. 3.

FIG. 11 is a flow chart illustrating a decoding control procedure and its contents by the error correction processing unit shown in FIG. 3.

FIG. 12 is a diagram showing the structure of an error correction encoding rate selection table provided in a wireless packet transfer apparatus according to a second embodiment of the present invention.

FIG. 13 is a flow chart illustrating an error correction encoding rate selection control procedure and its contents by the error correction processing unit shown in FIG. 12.

FIG. 14 is a diagram showing the structure of an error correction encoding rate selection table provided in a wireless packet transfer apparatus according to a third embodiment of the present invention.

FIG. 16 is a diagram showing the structure of an error correction encoding rate selection table provided in a wireless packet transfer apparatus according to a fourth embodiment of the present invention.

FIG. 17 is a flow chart illustrating a decoding control procedure and its contents by the error correction processing unit shown in FIG. 16.

FIG. 18 is a diagram showing the structure of an error correction rate selection table provided in the error correction processing unit of a wireless packet transfer apparatus according to another embodiment of the present invention.

DESCRIPTION OF THE EMBODIMENTS

First Embodiment

Figure 1:
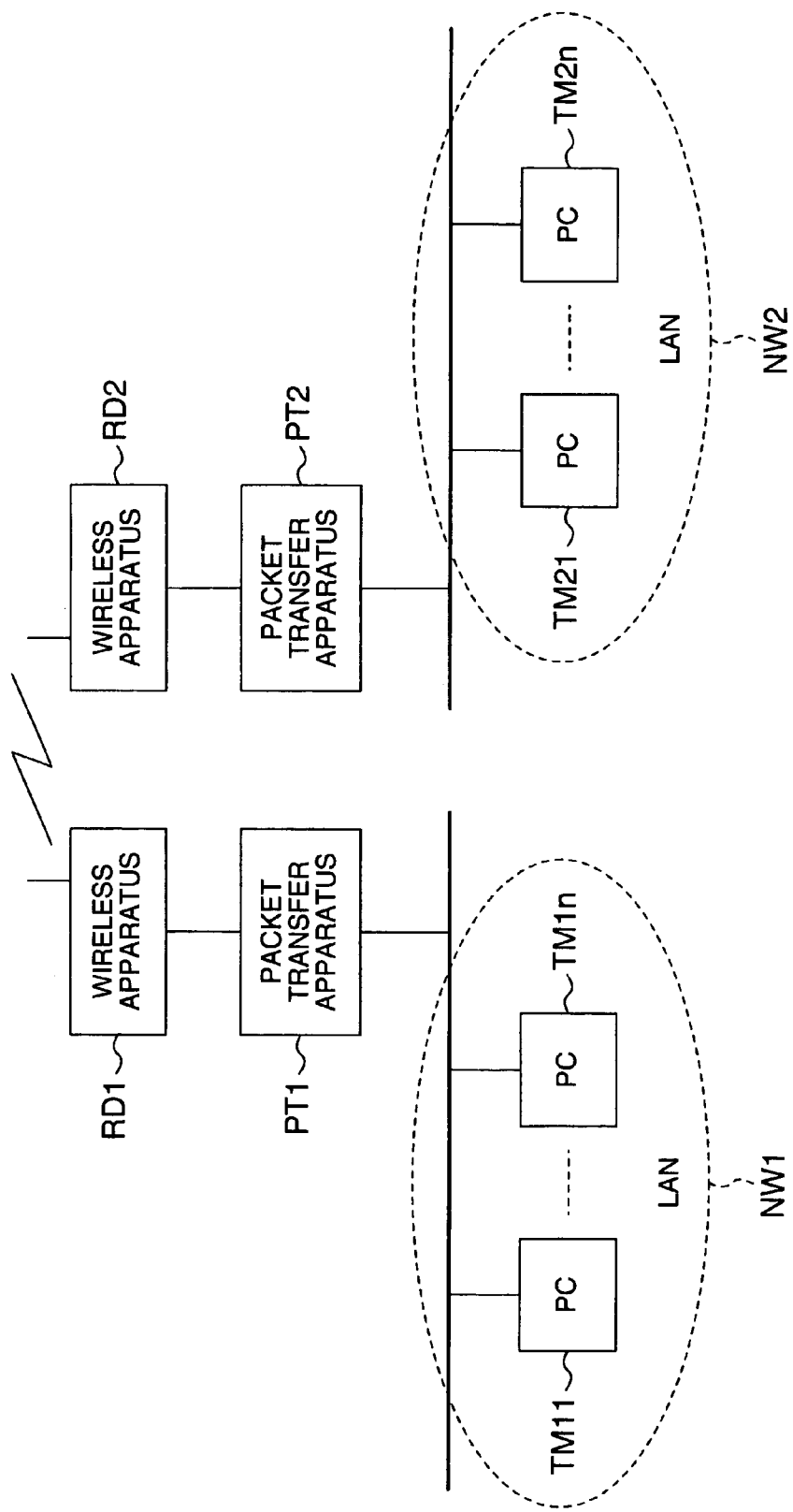
FIG. 1 is a schematic diagram showing the configuration of an anti-disaster wireless communication system using wireless packet transfer apparatuses according to a first embodiment of the present invention.

FIG. 1 is a schematic diagram showing the configuration of an anti-disaster wireless communication system using wireless packet transfer apparatuses according to the first embodiment of the present invention.

This system has first and second networks NW1 and NW2. These networks NW1 and NW2 are installed, for example, in prefectural or municipal offices of a self-governing body, and configured by wired Local Area Network (LAN). The networks NW1 and NW2 accommodate a plurality of information communication terminals TM11 to TM1n, and TM21 to TM2m, respectively. The networks NW11 and NW2 are connected to wireless apparatuses RD1 and RD2 via packet transfer apparatuses PT1 and PT2, respectively. These packet transfer apparatuses PT1 and PT2 and wireless apparatuses RD1 and RD2 are used for transferring packets between the first and second networks NW1 and NW2 via a wireless transmission path.

Figure 2:
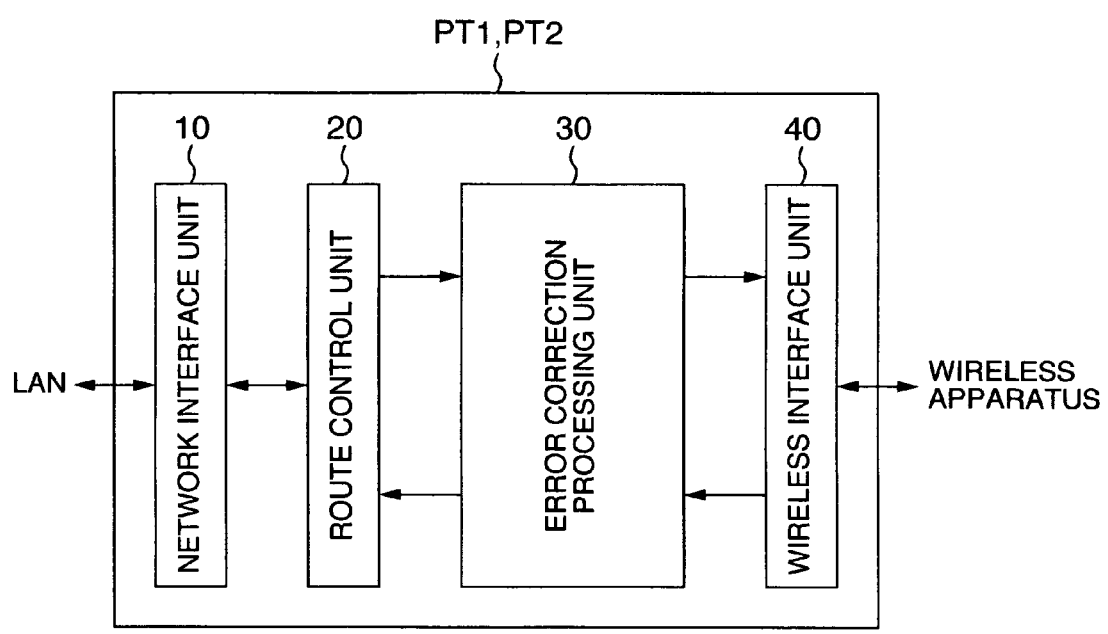
FIG. 2 is a functional block diagram illustrating the functions of the wireless packet transfer apparatus of the first embodiment.

As shown in FIG. 2, the packet transfer apparatuses PT1 and PT2 each have a network interface unit 10, a route control unit 20, an error correction processing unit 30 and a wireless interface unit 40. The network interface unit 10 transfers information data or control data in the packet unit between the first and second networks NW1 and NW2. The route control unit 20 judges a destination from the header of an input packet, and in accordance with the judgement result, transfers the packet to the information terminal TM1 in the first network NW1 via the network interface 10, or to the wireless interface unit 40 via the error correction processing unit 30. The wireless interface 40 transmits/receives a packet between the wireless apparatuses RD1 and RD2.

Figure 3:
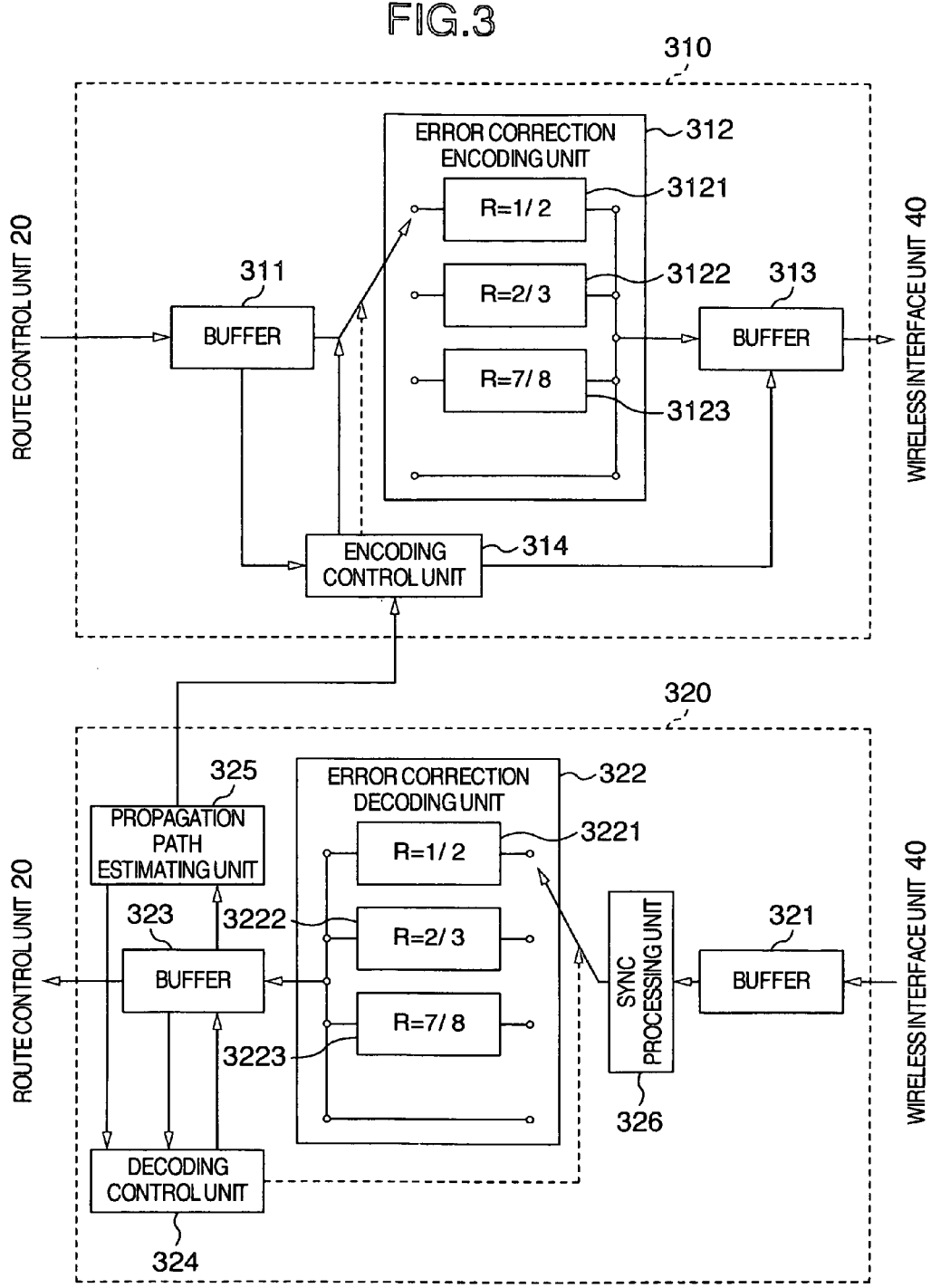
FIG. 3 is a block diagram showing the structure of an error correction processing unit of the wireless packet transfer apparatus shown in FIG. 2.

The error correction processing unit 30 is structured as in the following. FIG. 3 is a block diagram showing the structure of the error correction processing unit 30. The error correction processing unit 30 provides the function of a main portion of the present invention, and is constituted of a transmission processing unit 310 and a reception processing unit 320. The error correction processing unit 30 is constituted of a micro processor unit (MPU), a digital signal processor (DSP) and a random access memory (RAM). For example, MPU and DSP execute the function shown in FIG. 3 in a software manner by using a control program stored in a program memory. Constituent elements may be structured in a hardware manner.

The transmission processing unit 310 has a transmission input buffer 311, an error correction encoding unit 312, a transmission output buffer 313 and an encoding control unit 314.

The transmission input buffer 311 temporarily stores a transmission packet transferred from the route control unit 20 for the purpose of an error correction encoding process. The error correction encoding unit 312 has three error correction encoders 3121, 3122 and 3123 having different encoding rates. In the example shown in FIG. 3, the error correction encoders have encoding rates R=½, R=⅔ and R=⅞. The error correction encoding unit 312 error-correction encodes a transmission packet read from the transmission input buffer 311 by using one of the error correction encoders 3121, 3122 and 3123, and adds a sync bit and the like to generate an error correction encoding frame. The generated error correction encoding frame is output to the transmission output buffer 313. The transmission output buffer 313 holds temporarily the packet output from the error correction encoding unit 312 and then outputs it to the wireless interface unit 40.

The encoding control unit 314 has an error correction encoding rate selection table. This error correction encoding rate selection table stores an error correction encoding rate necessary for obtaining a desired Quality of Service (QoS), in correspondence with a protocol number representative of the type of a protocol expected to be used and a port number representative of an application type.

For example, assuming that a desired QoS of TCP is set to BER=$10^{-6}$ or lower, a desired QoS of UDP is set to BER=$10^{-5}$ or lower and a desired QoS of an UDP application represented by the port number is set to BER=$10^{-4}$ or lower, the desired QoS of each traffic can be obtained at a wireless transmission path having an expected BER=$2\times10^{-3}$. FIG. 8 shows an example of the error correction encoding rate table used in the first embodiment.

The encoding control unit 314 acquires the protocol number and port number from the header of the transmission packet temporarily stored in the transmission input buffer 311, and accesses the error correction encoding rate selection table by using the acquired protocol number and port number to thereby select an error correction encoding rate. In accordance with the selected error correction encoding rate, one of the error correction encoders 3121, 3122 and 3123 is selectively operated to make it execute the error correction encoding process.

Figures 4, 5:
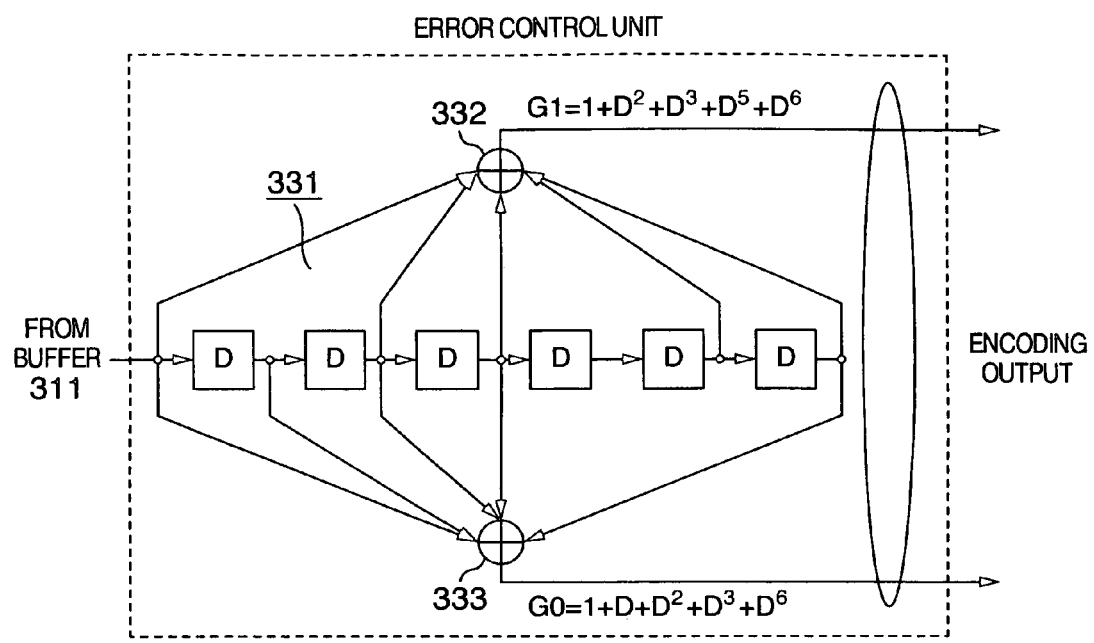
FIG. 4 is a diagram showing an example of the structure of an error correction encoding unit of the error correction processing unit shown in FIG. 3.
FIG. 5 is a diagram showing the relation between an encoding rate and a puncture pattern of the error correction encoding unit shown in FIG. 4.

For example, convolution encoders are used as the error correction encoders 3121, 3122 and 3123. FIG. 4 shows an example of the structure of a convolution encoder having a constraint length of 7. The convolution encoder is constituted of a shift resister 331 and two adders 332 and 333 for synthesizing respective tap outputs. In FIG. 4, data is input to the shift register 331 and encoded by generator polynomials $G0=1+D+D^2+D^3+D^6$ and $G1=1+D^2+D^3+D^5+D^6$. The calculation results of the generator polynomials are alternately output from the adders 332 and 333 as the encoded data.

As seen from a correspondence table between an encoding rate and a puncture pattern shown in FIG. 5, the error correction encoding rate can be changed by deleting an output bit at a position of C0=0 for the G0 output and deleting an output bit at a position of C1=0 for the G1 output.

The reception processing unit 320 has a reception input buffer 321, a sync processing unit 326, an error correction decoding unit 322, a reception output buffer 323, a decoding control unit 324 and a propagation path estimating unit 325.

The reception input buffer 321 temporarily stores reception frame data transferred from the wireless interface unit 40 for the purpose of an error correction decoding process. The sync processing unit 326 executes a frame sync establishing process for the reception frame data read from the reception input buffer 321. The error correction decoding unit 322 has three error correction decoders 3221, 3222 and 3223 corresponding to three error correction encoding rates R=½, R=⅔ and R=⅞ of the error correction encoding unit 312. The error correction decoding process and a frame disassembling process are executed for the reception frame data subjected to the frame sync processing, by using one of the three error correction decoders 3221, 3222 and 3223 to thereby recover the reception packet. The recovered reception packet is output to the reception output buffer 323. The reception output buffer 323 temporarily holds the recovered reception packet and then transfers it to the route control unit 20.

The decoding control unit 324 has a decoding control table. This decoding control table stores information on an error frame processing method suitable for each protocol and each application, in correspondence with a protocol number representative of the type of a protocol expected to be used and a port number representative of an application type. The storage contents are created by considering the desired QoS of each traffic and each application. For example, an error frame is discarded for the protocol not permitting an error such as TCP, and an error frame is transferred for the application permitting an error. FIG. 9 shows an example of the decoding control table.

The decoding control unit 324 selects one of the error correction decoders 3221, 3222 and 3223 in accordance with encoding rate information derived from the start of the reception frame data, and makes the selected error correction decoder execute the error correction decoding process for the reception frame data. It is judged whether there is an error in the reception frame data subjected to error correction decoding by the error correction decoding unit 322. If it is judged that there is an error, the decoding control table is accessed by using the protocol number and port number for the reception frame data to select an error frame processing method. In accordance with the selected processing method, a transfer process or a discard process is executed for the reception frame data.

If the error correction encoding unit 312 uses convolution encoders, the error correction decoding unit 322 generally uses corresponding Viterbi decoders. Viterbi decoding is described in detail in the document "Error Correction Code and its Application" by Etoh and Kaneko, Ohmsha, Ltd. pp. 161 to 164 (1997). Encoded data with deleted bits by the puncture pattern can be decoded by inserting dummy bits at bit positions removed by the puncture pattern, in the same method as that for no bit deletion by the puncture pattern.

The propagation path estimating unit 325 estimates a bit error rate (BER) in accordance with an error correction decoding result of the reception frame by the error correction decoding unit 322. The relation between BER and an error correction ability of error correction code is already determined. For example, if the generator polynomials shown in FIG. 4 are used and soft-decision Viterbi decoding is used as error correction decoding, errors up to $BER=10^{-2}$ can be reduced to $BER=10^{-5}$ or smaller at the encoding rate $R=\frac{1}{2}$, errors up to $BER=3\times10^{-3}$ can be reduced to $BER=10^{-5}$ or smaller at the encoding rate $R=\frac{2}{3}$, and errors up to $BER=3\times10^{-3}$ can be reduced to $BER=10^{-5}$ or smaller at the encoding rate $R=\frac{7}{8}$. If an error is not detected in the Viterbi decoding result, the Viterbi decoding result is again encoded and compared with the reception data before Viterbi decoding so that BER can be estimated.

Therefore, if frame data having a data length of $10^4$ before encoding is encoded at the encoding rate $R=\frac{1}{2}$, BER can be estimated in a range of $10^{-2}$ to $10^{-4}$. BERs extracted by this method are acquired for a plurality of frames, and an average of BERs is used for estimating BER. In this manner, BER of $10^{-4}$ or smaller can be estimated and a precision of an estimated BER can be improved by absorbing an instantaneous variation in the propagation path.

Next, description will be made on the operation of the packet transfer apparatus constructed as above. Since the packet transfer apparatuses PT1 and PT2 have the same structure, the packet transfer apparatus PT1 will be described by way of example.

(1) When a transmission packet sent from the network NW1 is transferred to the wireless transmission path, the transmission packet sent from the network NW1 is input to the error correction processing unit 30 via the network interface unit 10 and route control unit 20, and then the error correction processing unit 30 executes the following error correction encoding process.

Namely, as the transmission packet is stored in the transmission input buffer 311, the encoding control unit 314 stores a sync bit for an error correction encoding frame in the transmission output buffer 313. Next, the encoding control unit 314 counts a length of the transmission packet stored in the transmission input buffer 311 to acquire frame length information, and calculates a frame check sequence (FCS) for transmission packet error detection. Next, the encoding control unit 122 calculates FCSs of the acquired frame length information and encoding rate information representative of an encoding rate for error correction encoding of the transmission path to generate an encoding information field.

The error correction encoding unit 312 encodes the generated encoding information field at a predetermined encoding rate, e.g., $R=\frac{1}{2}$ and stores the encoded result in the transmission output buffer 313. Next, the error correction encoding unit 312 encodes the transmission packet stored in the transmission input buffer 311 and the transmission packet error detection FCS at the encoding rate designated by the encoding control unit 314, and stores the encoded result in the transmission output buffer 313. The error correction encoding frame stored in the transmission output buffer 313 is output to the wireless interface unit 40.

FIG. 6 shows the format of the error correction encoding frame. The error correction encoding frame is constituted of a sync bit of K bits, an encoding information field of L bits, a frame data field of M bits and an FCS (N bits) of the frame data field. Inserted in the encoding information field are encoding rate information of L0 bits, frame length information of L1 bits and FCS (L2 bits) of the frame length information and encoding rate information. FCS is calculated as a remainder of division by an exclusive logical sum of a whole bit train to be subjected to error detection and a specific bit train.

Figure 10:
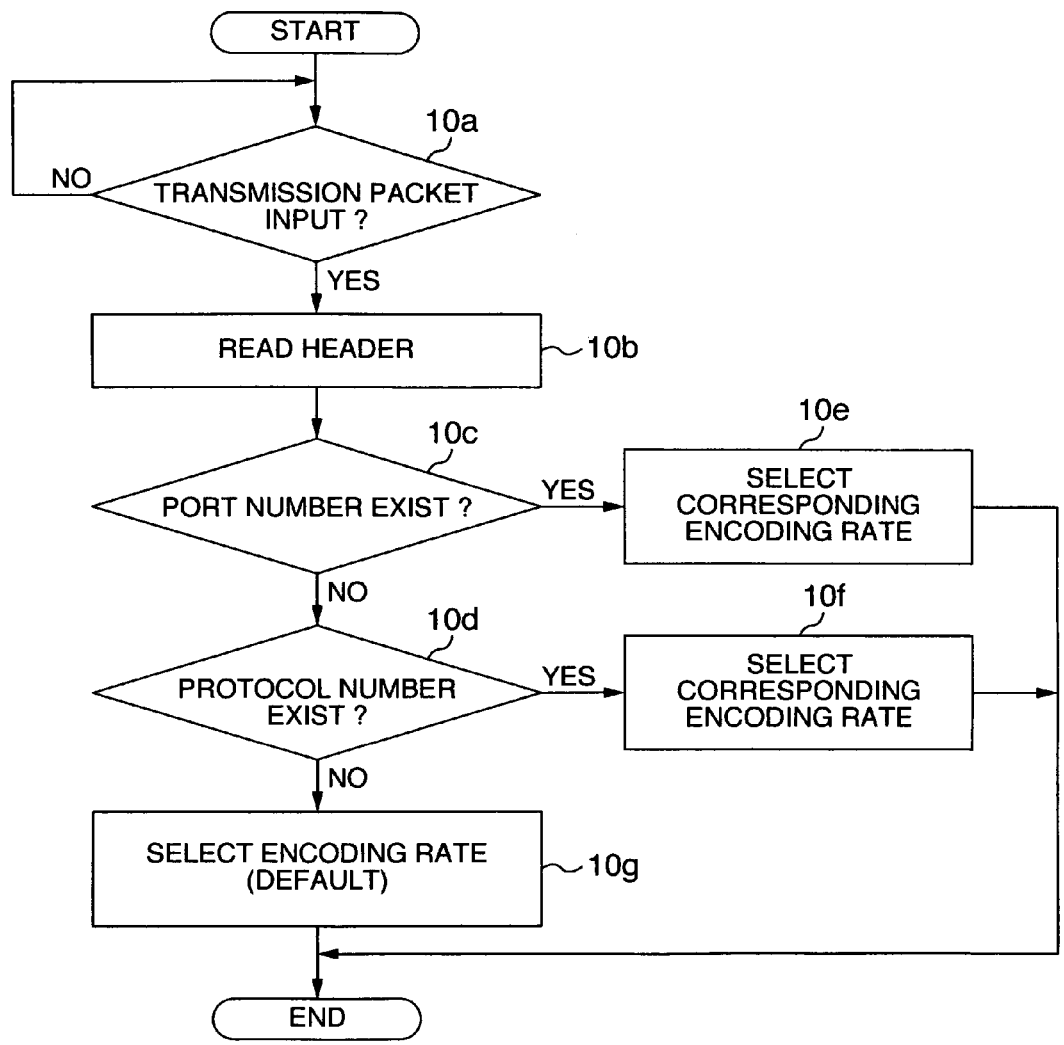
FIG. 10 is a flow chart illustrating an error correction encoding rate selection control procedure and its contents by the error correction processing unit shown in FIG. 3.

For the error correction encoding process for the transmission packet, the encoding control unit 314 sets an error correction encoding rate in the following manner. FIG. 10 is a flow chart illustrating the control procedure and its contents.

Figure 7A:
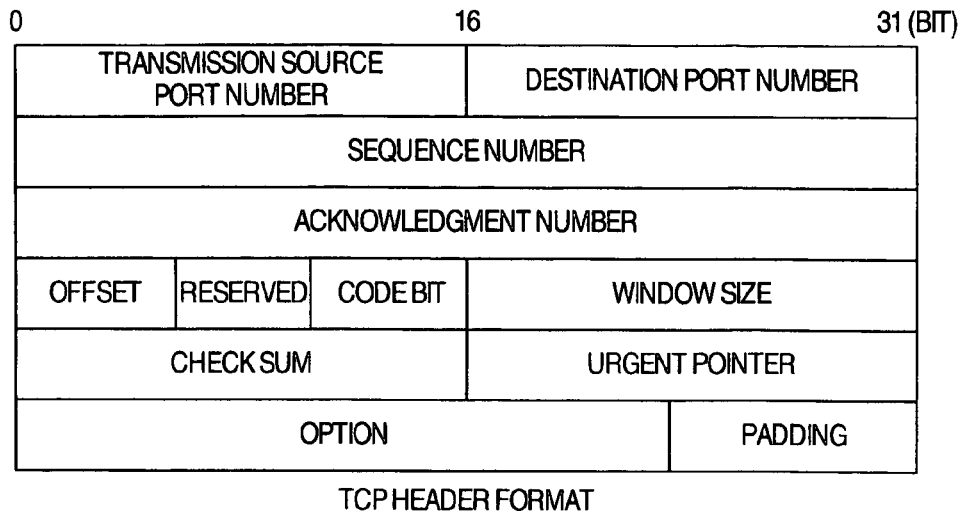
FIGS. 7A, 7B and 7C are diagrams showing the formats of a TCP header, a UDP header and an IP header.
Figure 7B:
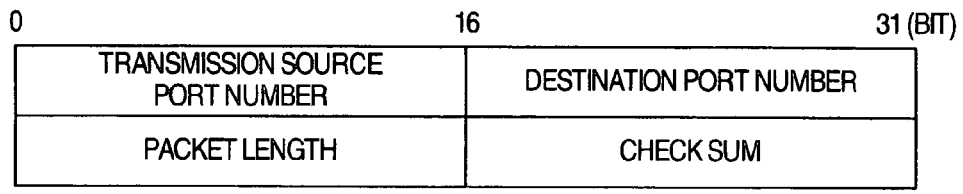
Figure 7C:
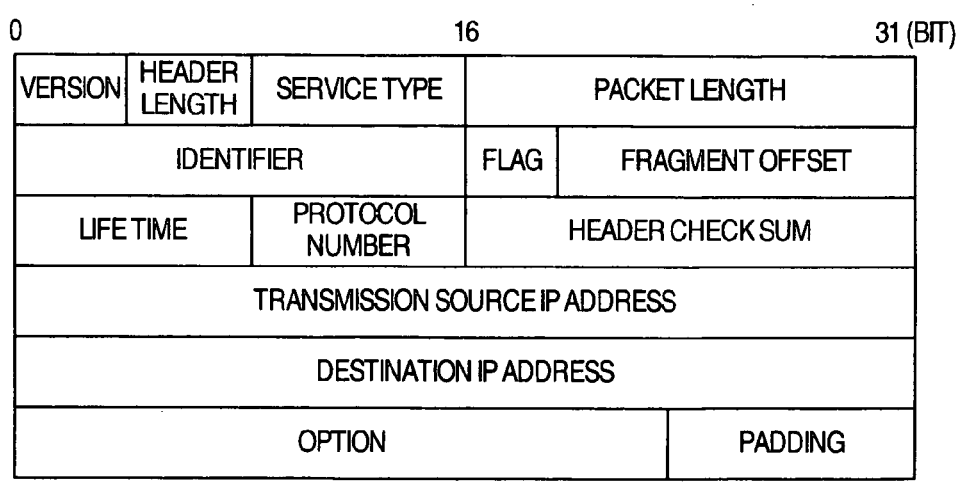

Namely, as a transmission packet is stored in the transmission input buffer 311, the flow advances from Step 10a to Step 10b whereat the encoding control unit 314 judges the protocol type and application type from the header of the transmission packet. For example, if the transmission packet is an IP packet, the protocol number is acquired from the protocol number field of the IP header shown in FIG. 7C, and judges the type of a protocol such as TCP and User Datagram Protocol (UDP), from the acquired protocol number. The port number is acquired from the port number field of the upper level UDP or TCP header shown in FIGS. 7A and 7B, and judges the application type from the acquired port number.

Next, the encoding control unit 314 selects an error correction encoding rate in accordance with the judgement results of the protocol type and application type and the error correction encoding rate selection table. For example, it is herein assumed that the error correction encoding rate selection table is structured as shown in FIG. 8. First, at Step 10c the encoding control unit 314 judges whether there is the port number, and if the port number can be acquired, the encoding control unit selects the encoding rate $R=\frac{7}{8}$ at Step 10e.

If the port number cannot be acquired, the flow advances to Step 10d whereat it is judged whether the protocol number can be acquired. If acquired, an encoding rate $R=\frac{3}{4}$ is selected at Step 10f.

If both the port number and protocol number cannot be acquired, the flow advances to Step 10g whereat a default encoding rate $R=\frac{1}{2}$ is selected. In this manner, it is possible to select an error correction encoding rate corresponding to the protocol (traffic) type and application type of the transmission packet.

(2) Error correction encoding frame data received at the wireless apparatus RD1 is decoded and transferred to the network NW1.

As reception frame data transferred from the wireless interface unit 40 is input to the error correction processing unit 30, the error correction processing unit 30 executes the following error correction decoding process. Namely, as the reception frame data is stored in the reception input buffer 321, the sync processing unit 326 calculates a correlation between the reception frame data train and the sync bits. A timing when the correlation output becomes larger than a predetermined value, is decided as the start of the frame and the sync bits are detected by permitting bit errors. The error correction decoding unit 322 fetches the encoding information field followed by the sync bits and executes the error correction decoding process at the decoder having a predetermined encoding rate, e.g., the decoder 3221 with R=½, to decode the encoding information field. This decoded encoding information field is supplied to the decoding control unit 324.

In accordance with FCS of the decoding result of the encoding information field, the decoding control unit 324 detects an error in the encoding information field. If an error is not detected in the decoding result, the following process is executed at the error correction processing unit 30.

Namely, the error correction decoding unit 322 extracts the encoding rate information and frame length information from the decoded encoding information field. The sync processing unit 326 supplies the error correction decoding unit 322 with the reception data in the frame data field following the encoding information field and subsequent field. The error correction decoding unit 332 executes the error correction decoding process at the decoder having the encoding rate indicated by the encoding rate information extracted at the frame start position. The error correction decoding unit 322 judges the end of the error correction encoding frame in accordance with the frame length information extracted at the frame start position. As the decoding process for the frame is completed, the error correction decoding unit 322 stores the reception packet recovered by the decoding process and frame disassembling process, in the reception output buffer 323. The decoding control unit 324 detects an error in the frame data field in accordance with FCS of the decoded data. If an error is not detected, the reception packet stored in the reception output buffer 323 is transferred to the route control unit 20.

If an error is detected in the frame data filed after the decoding process, the decoding control unit 324 performs error processing for the reception packet having an error, in the following manner.

FIG. 11 is a flow chart illustrating the control procedure and its contents.

Namely, as a reception packet having an error is stored in the reception output buffer 323, the flow moves from Step 11*a* to Step 11*b* whereat the decoding control unit 324 acquires information for judging the protocol type and application type from the header of the reception packet. By using the acquired information representative of the types, the decoding control table is accessed to decide the error processing method.

For example, it is assumed that the decoding control table is structured as shown in FIG. 9. First at Step 11*c*, the decoding control unit 324 judges whether the port number of the reception packet is registered in the port number field of the decoding control table. If it is judged that the port number is registered, at Step 11*e* the reception packet is transferred from the reception output buffer 323 to the route control unit 20 in accordance with the frame error processing method defined in the decoding control table.

If the port number is not registered, at Step 11*d* the decoding control unit 324 judges whether the protocol number of the reception packet is registered in the protocol number field of the decoding control table. If the protocol number is registered, the error frame processing is performed in accordance with the error frame processing method defined in the decoding control table. In this case, since the error frame processing method is "discard", the reception packet stored in the reception output buffer 323 is discarded.

If both the port number and protocol number of the reception packet are not registered in the decoding control table, at Step 11*g* the decoding control unit 324 executes a packet discarding process in accordance with initial values (default values) of the error frame processing method registered in the decoding control table.

A check sum field is inserted into the IP header, a TCP header and a UDP header. It is therefore possible to judge whether the header is broken, even if the frame contains an error. If an error is detected in the decoding result of the encoding information field, the error correction decoding process is not executed for the frame data field following the encoding information field, but it stands by until the next frame is received.

As described above, according to the first embodiment, the error correction encoding rate selection table is provided in the error correction processing units 30 of the packet transfer apparatuses PT1 and PT2. The error correction encoding rate selection table stores the preset error correction encoding rate necessary for maintaining a desired QoS, in correspondence with each protocol type and each application type. When a transmission packet is transferred to the wireless transmission path, the encoding control unit 314 judges the protocol type and application type of the transmission packet from the header of the transmission packet. In accordance with the judgement result and the error correction encoding rate selection table, the error correction encoding rate is selected, and the transmission packet is subjected to error correction encoding by using the selected encoding rate.

Therefore, the error correction encoding rate necessary for maintaining a desired QoS is selected for each transmission packet in accordance with the protocol type and application type. In accordance with the selected encoding rate, the transmission packet is subjected to error correction encoding and transferred to the wireless transmission path. Accordingly, each transmission packet is transmitted by wireless at the error correction encoding rate sufficient for a desired QoS so that wireless packet transmission of a high throughput can be realized even in a circuit switched wireless communication system, while a desired QoS for each transmission packet is maintained and the limited narrow transmission band is effectively utilized.

Further, according to the first embodiment, the decoding control table is provided and stores information for determining whether the reception packet having an error is transferred or discarded, in correspondence to each protocol type and each application type. If the reception packet has an error the decoding control unit 324 judges the protocol type and application type of the transmission packet from the header of the reception packet. In accordance with the judgment result and the decoding control table, the error processing method is selected, and in accordance with the selected processing contents, it is decided whether the reception packet having an error is transferred to a destination or discarded.

It is therefore possible to selectively execute a transfer/discard process for an error packet in accordance with the protocol type and application type. Therefore, if the reception packet uses an application having own error correction ability such as MPEG4 and even if an error is detected, the reception packet is not discarded unconditionally but can be transferred toward the information communication terminals TM11 to TM1n of the network NW1. It is therefore possible to improve a throughput.

Furthermore, by using the packet transfer apparatuses PT1 and PT2 of the first embodiment, the information communication terminals TM11 to TM1n and TM21 to TM2m and communication applications are not required to consider wireless transmission but information communication terminals and communication applications same as those in a wired environment can be used. It is therefore unnecessary to design the wireless apparatuses RD1 and RD2 in accordance with the protocol type and application type, and it can be expected that the wireless communication system is realized at low cost.

Second Embodiment

The second embodiment of the present invention uses an error correction encoding rate selection table considering a wireless propagation quality, and an error correction encoding rate is selected in accordance with an estimated value of a propagation quality of a wireless transmission path and the error correction encoding rate selection table, and in accordance with the selected encoding rate, a transmission packet is subjected to error correction encoding and transferred to a wireless transmission path.

FIG. 12 is a diagram showing the structure of the error correction encoding rate selection table provided in the packet transfer apparatus according to the second embodiment of the present invention. The whole structure of an anti-disaster wireless communication system and the structures of packet transfer apparatuses PT1 and PT2 and an error correction processing unit 30 are similar to those shown in FIGS. 1 to 3, and the detailed description thereof is omitted.

As shown in FIG. 12, the error correction encoding rate selection table stores the preset error correction encoding rate necessary for maintaining a desired QoS in each estimated propagation quality BER state, in correspondence with each estimated BER of a wireless transmission path. The contents stored in the table are set so that a desired QoS of the whole track is fixed and maintained constant irrespective of a variation in a propagation path.

By using the error correction encoding rate selection table, the encoding control unit 314 executes the error correction encoding process in the following manner. FIG. 13 is a flow chart illustrating the control procedure and control contents.

Namely, as a transmission packet is stored in the transmission input buffer 311, the flow moves from Step 13a to Step 13b whereat the encoding control unit 314 acquires a current estimated BER of a wireless transmission path from a propagation path estimating unit 325. An error correction encoding rate is selected in accordance with the acquired estimated BER and the error correction encoding rate selection table.

For example, it is assumed that the error correction encoding rate selection table is structured as shown in FIG. 12. First at Step 13c, the encoding control unit 314 compares the acquired current estimated BER with a threshold value A. If BER≧A, then at Step 13e an encoding rate R=½ is selected. If BER<A, then at Step 13d the acquired estimated BER is compared with a threshold value B. If the comparison result indicates BER≦B, then at Step 13f an encoding rate R=⅞ is selected. If the estimated BER is larger than the threshold value B, i.e., A>BER>B, then at Step 13g an encoding rate R=¾ is selected. In this manner, it becomes possible to select an encoding rate suitable for the propagation quality of the wireless transmission path.

According to the second embodiment, therefore, an error correction encoding rate is selected in accordance with a current propagation quality of the wireless transmission path, and in accordance with the selected error correction encoding rate, a transmission packet is subjected to error correction encoding and transmitted to the wireless transmission path. Accordingly, a wireless packet transmission of a high throughput can be realized even if a propagation quality of the wireless transmission path varies, while a desired QoS is maintained and the limited narrow transmission band is effectively utilized.

Third Embodiment

The third embodiment of the present invention uses an error correction encoding rate selection which stores a preset error correction encoding rate necessary for maintaining a desired QoS, in correspondence with a protocol type and an application type and a propagation quality of a wireless transmission path. For each transmission packet, the protocol type and application type and an estimated BER of the wireless communication path are acquired. In accordance with the acquired information, an error correction encoding rate is selected from the error correction encoding rate selection table. In accordance with the selected encoding rate, the transmission packet is subjected to error correction encoding and transferred to the wireless transmission path.

FIG. 14 is a diagram showing the structure of the error correction encoding rate selection table provided in the packet transfer apparatus according to the third embodiment of the present invention. Also in this embodiment, the whole structure of an anti-disaster wireless communication system and the structures of packet transfer apparatuses PT1 and PT2 and an error correction processing unit 30 are similar to those shown in FIGS. 1 to 3 of the first embodiment, and the detailed description thereof is omitted.

As shown in FIG. 14, the error correction encoding rate selection table stores the preset error correction encoding rate necessary for maintaining a desired QoS, in correspondence with a protocol number representative of the protocol type and a port number representative of the application type and in correspondence with BERs at three stages. The contents stored in the table are set so that a desired QoS of the track and application is maintained even if a propagation path state changes. By considering that an estimated BER is not still acquired immediately after the start of communications, the error correction encoding rate selection table stores also initial values (default values) of encoding rates in correspondence with the protocol type and application type.

Figure 15:
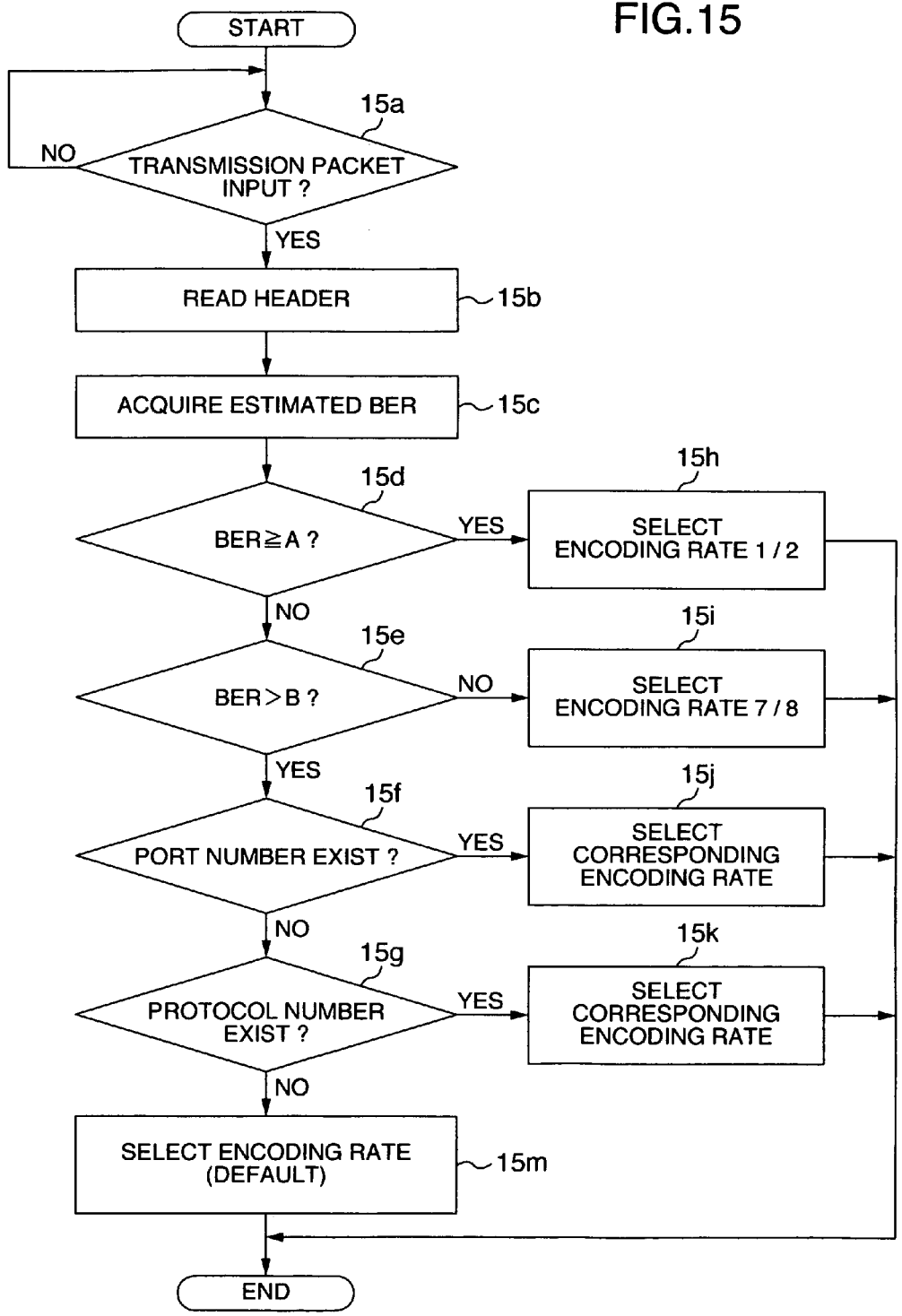
FIG. 15 is a flow chart illustrating an error correction encoding rate selection control procedure and its contents by the error correction processing unit shown in FIG. 14.

By using the error correction encoding rate selection table, the encoding control unit 314 executes the error correction encoding process in the following manner. FIG. 15 is a flow chart illustrating the control procedure and control contents.

Namely, as a transmission packet is stored in the transmission input buffer 311, the flow moves from Step 15a to Step 15b whereat the encoding control unit 314 judges the protocol type and application type from the header of the transmission packet. At Step 15c, a current estimated BER of a wireless transmission path is acquired from a propagation path estimating unit 325. An error correction encoding rate is selected by accessing the error correction encoding rate selection table in accordance with the judgment results of the protocol type and application type and the acquired estimated BER.

For example, it is assumed that the error correction encoding rate selection table is structured as shown in FIG. 14. First at Step 15d, the encoding control unit 314 compares the acquired current estimated BER with a threshold value A. If BER≧A, then at Step 15h an encoding rate R=½ is selected. If BER<A, then at Step 15e the acquired estimated BER is compared with a threshold value B. If the comparison result indicates BER≦B, then at Step 15i an encoding rate R=⅞ is selected.

If the estimated BER is larger than the threshold value B, i.e., A>BER>B, then at Step 15f the encoding control unit 314 judges whether there is the port number. If the port number is acquired, then at Step 15j an encoding rate R=⅞ is selected. If the port number is not acquired, it is judged at step 15g whether the protocol number is acquired. If acquired, then at Step 15k an encoding rate R=¾ is selected. If both the port number and protocol number are not acquired, then at Step 15m a default encoding rate R=½ is selected.

In this manner, it becomes possible to select an encoding rate suitable for the estimated BER of the wireless transmission path and the protocol (traffic) type and application type of the transmission packet.

As described above, according to the third embodiment, the error correction encoding rate selection table stores the preset error correction encoding rate necessary for maintaining a desired QoS, in correspondence with the protocol number representative of the protocol type and the port number representative of the application type and in correspondence with BERs at three stages. Each time a transmission packet is input, an encoding rate selection process is executed in accordance with an estimated BER, and if the estimated BER is A>BER>B, an encoding rate is selected in accordance with the application type and protocol type.

According to the third embodiment, therefore, an error correction encoding rate is selected by considering a current propagation quality of the wireless transmission path and the protocol type and application type. A transmission packet is subjected to error correction encoding at the selected error correction encoding rate and transmitted to the wireless transmission path. Accordingly, a wireless packet transmission of a high throughput can be realized even if a propagation quality of the wireless transmission path varies, irrespective of the protocol type and application type, while a desired QoS is maintained and the limited narrow transmission band is effectively utilized.

Fourth Embodiment

The fourth embodiment of the present invention prepares a decoding control table which stores an error processing method for an error packet, in correspondence with a protocol type and an application type, and by considering an allowable value of QoS for each of these types. When error processing is performed for a reception packet having an error, the decoding control table is accessed in accordance with the protocol type and application type of the reception packet to thereby select an optimum error processing method.

FIG. 16 is a diagram showing the structure of the decoding control table provided in the packet transfer apparatus according to the fourth embodiment of the present invention. Also in this embodiment, the whole structure of an anti-disaster wireless communication system and the structures of packet transfer apparatuses PT1 and PT2 and an error correction processing unit 30 are similar to those shown in FIGS. 1 to 3 of the first embodiment, and the detailed description thereof is omitted.

As shown in FIG. 16, the decoding control table stores the error frame processing method in correspondence with a protocol number representative of a protocol type estimated to be used and a port number representative of an application type, and an allowable value of QoS set to each of these types. The contents stored in the table are set so that an error frame is discarded for the protocol not permitting an error such as TCP, an error frame is transferred if the packet has a desired QoS or higher, for the application permitting a data error, and an error frame is discarded if a desired QoS is not satisfied.

By using the decoding control table, the decoding control unit 324 performs error processing for a reception packet having an error in the following manner. FIG. 17 is a flow chart illustrating the control procedure and control contents.

Namely, as a reception packet is stored in the reception input buffer 323, the flow moves from Step 17a to Step 17b whereat the decoding control unit 324 acquires information for judging the protocol type and application type, from the header of the reception packet. At Step 17c, a current estimated BER of a wireless transmission path is acquired from the propagation estimating unit 325. An error processing method is selected by accessing the decoding control table in accordance with the judgment results of the protocol type and application type and the acquired estimated BER.

For example, it is assumed that the decoding control table is structured as shown in FIG. 16. First at Step 17d, the decoding control unit 324 judges whether the port number of the reception packet is registered in the port number field of the decoding control table. If it is judged that the port number is registered, at Step 17e it is judged whether the current estimated value satisfies the allowable BER stored in the decoding control table. If satisfied, at Step 17f the reception packet having an error is transferred from the reception output buffer 323 to the route control unit 20 in accordance with the processing contents "transfer" defined in the decoding control table. If the current estimated BER does not satisfy the allowable BER, then at Step 17g the reception packet stored in the reception output buffer 323 is discarded in accordance with the error frame processing method stored in the decoding control table.

If the port number of the reception packet is not registered in the decoding control table, then at Step 17h the decoding control unit 324 judges whether the protocol number of the reception packet is registered in the protocol number field of the decoding control table. If the protocol number is registered, then at Step 17i it is judged whether the current estimated BER satisfies the allowable BER defined in the decoding control table. If satisfied, at Step 17j, the reception packet having an error is transferred from the reception output buffer 323 to the route control unit 20, in accordance with the processing method defined in the decoding control table. If the current estimated BER does not satisfy the allowable BER, then at Step 17k the reception packet stored in the reception output buffer 323 is discarded in accordance with the error frame processing method defined in the decoding control table. For the protocol type whose allowable BER is not defined, the reception output buffer 323 discards the reception packet in accordance with the error frame processing method defined in the decoding control table. If both the port number and protocol number of the reception packet are not registered in the decoding control table, at Step 11m the decoding control unit 324 executes a packet discarding process in accordance with initial values (default values) of the error frame processing method registered in the decoding control table.

As described above, according to the fourth embodiment, when error processing for a reception packet having an error is performed, whether the reception packet is transferred or discarded is decided by considering the protocol type and application type of the reception packet and the allowable BER set to each of the protocol type and application type. It is therefore possible to perform more suitable error frame processing, by considering not only the protocol type and application type of the reception packet but also the allowable BER.

Other Embodiments

When an error correction encoding rate is selected, it may consider not only the protocol number and port number of a reception packet but also application information at a higher level. For example, a Real-time Transport Protocol (RTP) application can process a plurality of streams such as audio and video. Each stream can be distinguished from an SSRC field of an RTP packet.

FIG. 18 shows an example of an error correction encoding rate selection table for a stream of the RTP packet. As shown, set to the error correction encoding rate selection table as the transmission conditions are a protocol number representative of a protocol type, a port number representative of an application type, and an SSRC field representative of a stream type. The error correction encoding rate table stores an error correction encoding rate necessary for maintaining a desired QoS, in correspondence with the protocol number and port number, the SSC field and BER ranges at three stages.

By selecting an error correction encoding rate by using the error correction encoding rate selection table, even with the same protocol, an error correction encoding rate can be selected which differs among streams.

Of these streams, a video stream transmits in some cases a plurality type of encoding packets having different resolutions. For example, in MPEG4, low resolution encoding packets and high resolution encoding packets are multiplexed on the transmission side, and the reception side reproduces images in accordance with a plurality of encoding packets having different resolutions. In such a case, a field representative of a resolution type is added to the error correction encoding rate selection table. In this manner, an encoding rate can be selected by considering also the resolution of a video packet.

The storage contents of the error correction encoding rate selection table and decoding control table may be fixed or rewritable. For a rewritable type, a rewritable non-volatile memory is prepared and the registration contents are written in the memory when a packet transfer apparatus is shipped. If necessary, the storage contents are renewed, for example, by transmitting a maintenance message containing update data to a packet transfer apparatus from a personal computer connected to a network.

Although various processes to be executed by the packet transfer apparatus may be executed by making a microprocessor execute a control program stored in a read-only memory (ROM) in the manner described in each of the above-described embodiments, the invention is not limited thereto. For example, each functional means for executing each process may be structured as an independent hardware circuit.

The control program may be sold, transferred or used by storing it in a computer readable recording medium such as a floppy (registered trademark) disc, a compact disc (CD) and a ROM. It is obvious that the control program may be acquired via an electric communication line and used by installing the acquired control program to a packet transfer apparatus.

It is possible to reduce in practice the present invention by modifying in various forms, without departing from the gist of the present invention, the usage and configuration of a wireless communication system to which the present invention is applied, the structure of a packet transfer apparatus, the selection control procedure of an error correction encoding rate and its contents, the selection control procedure of an error processing method and its contents, the structures of the error correction encoding rate selection table and decoding control table, the type of error correction encoding code, the type of an encoding rate and the like.

In summary, the present invention is not limited only to the above-described embodiments, but the constituent elements may be modified and realized without departing from the gist of each embodiment. Various inventions are made by properly combining a plurality of constituent elements disclosed in each embodiment. For example, some constituent elements may be removed from the total constituent elements shown in each embodiment. Constituent elements in different embodiments may be properly combined.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless packet transfer apparatus to be used in a circuit switched wireless communication system for transmitting a packet among a plurality of networks via a wireless transmission path, comprising:

a table for storing error corresponding processing designating information for designating whether a reception packet having an error is transferred or discarded, said error corresponding processing designating information being preset to each of a plurality of expected transmission conditions to obtain a desired communication service quality when a packet is transmitted;

means for subjecting said reception packet to error correction encoding processing by each packet received via said wireless transmission path;

means for judging whether error exists in said reception packet after said error correction encoding processing is carried out;

means for judging transmission conditions of each transmission packet received via said wireless transmission path when error is judged to exist in said reception packet by said means for judging, and accessing said table in accordance with said judged transmission conditions to select error corresponding processing designating information; and means for executing transfer processing or discard processing for said reception packet in accordance with said selected error corresponding processing designating information.

2. The wireless packet transfer apparatus according to claim 1, wherein said table uses, as expected transmission conditions, at least one of a packet protocol type, a packet application type and a transmission quality of the wireless transmission path, and stores the expected transmission conditions and a corresponding error correction encoding rate preset to each of said expected transmission conditions to obtain the desired communication service quality under the expected transmission conditions.

3. The wireless packet transfer apparatus according to claim 1, wherein said table uses, as expected transmission conditions, a packet protocol type, a packet application type and a desired communication quality set to each of the types, and stores the expected transmission conditions and corresponding information for designating whether a reception packet having an error is transferred or discarded.

4. A wireless packet transfer method to be used in a circuit switched wireless communication system for transmitting a packet among a plurality of networks via a wireless transmission path, comprising steps of:

storing error corresponding processing designating information for designating whether a reception packet having an error is transferred or discarded, said error corresponding processing designating information being preset to each of a plurality of expected transmission conditions to obtain a desired communication service quality corresponding to the expected transmission conditions when a packet is transmitted;

subjecting said reception packet to error correction encoding processing by each packet received via said wireless transmission path;

judging whether error exists in said reception packet after said error correction encoding processing is carried out;

judging transmission conditions of each transmission packet received via said wireless transmission path when error is judged to exist in the reception packet by said means for judging, and accessing said table in accordance with said judged transmission conditions to select error corresponding processing designating information; and executing transfer processing or discard processing for said reception packet in accordance with said selected error corresponding processing designating information.

5. The wireless packet transfer method according to claim 4, wherein said table uses, as expected transmission conditions, at least one of a packet protocol type and a packet application type, and stores the expected transmission conditions and corresponding information for designating whether a reception packet having an error is transferred or discarded.

6. The wireless packet transfer method according to claim 4, wherein said table uses, as expected transmission conditions, a packet protocol type, a packet application type and a desired communication quality set to each of the types, and stores the expected transmission conditions and corresponding information for designating whether a reception packet having an error is transferred or discarded.

* * * * *